US007666968B2

(12) United States Patent
Zhu et al.

(10) Patent No.: US 7,666,968 B2
(45) Date of Patent: *Feb. 23, 2010

(54) ACENE-THIOPHENE COPOLYMERS WITH SILETHYNLY GROUPS

(75) Inventors: Peiwang Zhu, Woodbury, MN (US); Dennis E. Vogel, Lake Elmo, MN (US); Christopher P. Gerlach, Petaluma, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 625 days.

This patent is subject to a terminal disclaimer.

(21) Appl. No.: 11/379,642

(22) Filed: Apr. 21, 2006

(65) Prior Publication Data

US 2007/0249802 A1 Oct. 25, 2007

(51) Int. Cl.
*C08G 75/00* (2006.01)
(52) U.S. Cl. .......................................... 528/27; 528/377
(58) Field of Classification Search .................. 528/27, 528/377
See application file for complete search history.

(56) References Cited

U.S. PATENT DOCUMENTS

| 3,242,218 A | 3/1966 | Miller |
| 3,250,808 A | 5/1966 | Moore, Jr. et al. |
| 3,274,239 A | 9/1966 | Selman |
| 3,293,306 A | 12/1966 | Le Bleu et al. |
| 3,322,826 A | 5/1967 | Moore |
| 3,536,710 A | 10/1970 | Bartlett |
| 3,544,537 A | 12/1970 | Brace |
| 3,553,179 A | 1/1971 | Bartlett |
| 3,810,874 A | 5/1974 | Mitsch et al. |
| 3,864,318 A | 2/1975 | Caporiccio et al. |
| 4,321,404 A | 3/1982 | Williams et al. |
| 4,472,480 A | 9/1984 | Olson |
| 4,567,073 A | 1/1986 | Larson et al. |
| 4,647,413 A | 3/1987 | Savu |
| 4,818,801 A | 4/1989 | Rice et al. |
| 4,830,910 A | 5/1989 | Larson |
| 5,306,758 A | 4/1994 | Pellerite |
| 5,347,144 A | 9/1994 | Garnier et al. |
| 5,362,919 A | 11/1994 | Costello et al. |
| 5,454,880 A | 10/1995 | Saricifti et al. |
| 5,523,555 A | 6/1996 | Friend et al. |
| 5,578,278 A | 11/1996 | Fall et al. |
| 6,127,498 A | 10/2000 | Tonelli et al. |
| 6,291,621 B1 | 9/2001 | Tan et al. |
| 6,355,365 B1 | 3/2002 | Hotta et al. |
| 6,359,149 B1 | 3/2002 | Tan et al. |
| 6,433,359 B1 | 8/2002 | Kelley et al. |
| 6,585,914 B2 | 7/2003 | Marks et al. |
| 6,602,395 B1 | 8/2003 | Zhuang et al. |
| 6,608,323 B2 | 8/2003 | Marks et al. |
| 6,617,609 B2 | 9/2003 | Kelley et al. |
| 6,690,029 B1 | 2/2004 | Anthony et al. |
| 6,821,348 B2 | 11/2004 | Baude et al. |
| 6,828,582 B1 | 12/2004 | Ando et al. |
| 6,864,396 B2 | 3/2005 | Smith et al. |
| 6,872,801 B2 | 3/2005 | Ong et al. |
| 6,897,164 B2 | 5/2005 | Baude et al. |
| 6,906,534 B2 | 6/2005 | Hoisington et al. |
| 6,946,597 B2 | 9/2005 | Sager et al. |
| 6,970,490 B2 | 11/2005 | Holmes et al. |
| 6,974,877 B2 | 12/2005 | Vogel et al. |
| 6,998,068 B2 | 2/2006 | Gerlach |
| 7,002,176 B2 | 2/2006 | Iechi et al. |
| 7,030,409 B2 | 4/2006 | Lee et al. |
| 7,049,629 B2 | 5/2006 | Wu et al. |
| 7,385,221 B1 | 6/2008 | Anthony et al. |
| 7,495,251 B2 * | 2/2009 | Zhu et al. ..................... 257/40 |
| 2003/0102471 A1 | 6/2003 | Kelley et al. |
| 2003/0151118 A1 | 8/2003 | Baude et al. |
| 2004/0067387 A1 | 4/2004 | Kim et al. |
| 2004/0104386 A1 | 6/2004 | Wu et al. |
| 2004/0119049 A1 | 6/2004 | Heeney et al. |
| 2004/0222412 A1 | 11/2004 | Bai et al. |
| 2005/0033263 A1 | 2/2005 | Gottlieb et al. |
| 2005/0035333 A1 | 2/2005 | Gerlach |
| 2005/0093031 A1 | 5/2005 | Akkerman et al. |
| 2006/0033086 A1 | 2/2006 | Gerlach |
| 2006/0102890 A1 | 5/2006 | Yamahara et al. |
| 2007/0102696 A1 | 5/2007 | Brown et al. |

FOREIGN PATENT DOCUMENTS

| EP | 0786820 | 7/1997 |
| JP | 02-218716 | 8/1990 |
| JP | 2001/151868 | 6/2001 |

(Continued)

OTHER PUBLICATIONS

Anthony et al., "Functionalized Pentacene: Improved Electronic Properties from Control of Solid-State Order", *Am. Chem. Soc.*, 2001, 123. pp. 9482-9483.

(Continued)

*Primary Examiner*—Kuo-Liang Peng
(74) *Attorney, Agent, or Firm*—Jean A. Lown

(57) ABSTRACT

Acene-thiophene copolymers with attached silylethynyl groups are provided that can be used in electronic devices. The copolymers are often soluble in common organic solvents and can be part of a coating composition.

20 Claims, No Drawings

FOREIGN PATENT DOCUMENTS

| JP | 2004-002806 | * | 1/2004 |
|---|---|---|---|
| WO | WO 03/095445 A1 | | 11/2003 |
| WO | WO 2005/055248 A2 | | 6/2005 |
| WO | WO 2005/092947 | | 10/2005 |

OTHER PUBLICATIONS

Brabec, Christopher J., "Organic Photovoltaics: Technology and Market", *Solar Energy Materials and Solar Cells*, 2004, vol. 83, pp. 273-292.

Chan et al., "A Soluable Pentacene: Synthesis, EPR and Electrochemical Studies of 2,3,9,10-Tetrakis(Trimethylsilyl)Pentacene", *Chem Commun.*, 2005, pp. 66-68.

Chen et al., "Regiocontrolled Synthesis of Poly(3-alkylthiophenes) Mediated by Rieke Zinc: Their Characterization and Solid-State Properties", *J. Am. Chem. Soc.*, 1995, 117, 233-244.

Clar et al., "The Nature of Para-Bond and of Para-Coupling", *Tetrahedron*, 1972, vol. 28, pp. 5049-5054.

Comel, "Efficient One Pot Preparation of Variously Substituted Thieno[2,3-*b*]thiophene", *Journal of Heterocyclic Chemistry*, 2001, 38, pp. 1167-1171.

Heeney et al., "Alkylidene Fluorene Liquid Crystalline Semiconducting Polymers for Organic Field Effect Transistor Devices", *Macromolecules*, 2004, 37, pp. 5250-5256.

Heeney, et al., "Stable Polythiophene Semiconductors Incorporating Thieno[2,3-b]thiophene", *J. Am. Chem. Soc.*, 2005, 127, pp. 1078-1079.

Hodge et al., "Synthesis of Poly(anthracene-2,6-diyl) and a Copolymer Containing Alternately Anthracene-2,6-diyl and *p*-phenylene Units", *Chem. Commun.*, 1997, pp. 73-74.

Ito et al., "Oligo(2,6-anthrylene)s: Acene-Oligomer Approach for Organic Field-Effect Transistors", *Angew. Chem., Int. Ed.*, 42, pp. 1159-1162 (2003).

Katz et al., "Synthetic Chemistry for Ultrapure, Processable, and High-Mobility Organic Transistor Semiconductors", *Acc. Chem. Res.*, vol. 34, pp. 359-369 (2001).

Laquindanum et al., "Synthesis, Morphology, and Field-Effect Mobility of Anthradithiophenes", *J. Am. Chem. Soc.*, 1998, vol. 120. pp. 664-672.

Loewe et al., "Regioregular, Head-to-Tail Coupled Poly(3-alkylthiophenes) Made Easy by the GRIM Method: Investigation of the Reaction and the Origin of Regioselectivity", *Macromolecules*; 2001, 34, pp. 4324-4333.

McCulloch et al., "Influence of Molecular Design on the Field-Effect Transistor Characteristics of Terthiophene Polymers", *Chem Mater.*, 2005, vol. 17, pp. 1381-1385.

McCullough et al., "Design, Synthesis, and Control of Conducting Polymer Architectures: Structurally Homogeneous Poly(3-alkylthiophenes)", *J. Org. Chem*, 1993, 58, pp. 904-912.

Meng et al., "High-Performance, Stable Organic Thin-Film Field-Effect Transistors Based on Bis-5'-alkylthiophen-2'-yl-2,6-anthracene Semiconductors", *J. Am. Chem. Soc.*, 2005, 127, pp. 2406-2407.

Miller et al., "Synthesis of β-Methoxy, Methyl-Capped α-Oligothiophenes", *J. Org. Chem.*, 60, pp. 6813-6819 (1995).

Musick et al., "Synthesis of Binaphthyl-Oligothiophene Copolymers With Emissions of Different Colors: Systematically Tuning the Photoluminescence of Conjugated Polymers", *Macromolecules*, 1998, vol. 31, pp. 2933-2942.

Nielson et al., "Structure-Property Relations of Regiosymmetrical 3,4-Dioxy-Functionalized Polythiophenes", *Macromolecules*, 2005, 38, 10379-10387.

Portnoy, J., "Fluorinated Acylthiophenes. Preparation of 5,5'-Diheptafluorobutyryl-2,2'-bithiophene *via* a Grignard Coupling Reaction", *Org. Chem*, 1967, vol. 32, pp. 233-234.

Rajca et al., Synthesis and Structure of Tetrathiophene With A Chiral 1,1'-binaphthyl Kink:, *Chem. Commun*, 2001, pp. 1060-1061.

Ried et al., *Angewante Chemie*, 1953, vol. 65, pp. 601.

Ruiz et al., "Repeat Unit Symmetry Effects on the Physical and Electronic Properties of Processable, Electrically Conducting, Substituted Poly (1,4-bis(2-thienyl)phenylenes)", *Macromolecules*, 1992, vol. 25, pp. 849-860.

Savu, Patricia M., "Fluoronated Higher Carboxylic Acids", *11 Kirk-Othmer Encyclopedia of Chemical Technology*, pp. 551-558, (4th Edition 1994).

Sheraw et al., "Spin-on Polymer Gate Dielectric for High Performance Organic Thin Film Transistors", *Materials Research Symposium Proceedings*, 2000, vol. 558, pp. 403-408.

Sirringhaus et al., "Mobility Enhancement in Conjugated Polymer Field-Effect Transistors Through Chain Alignment in a Liquid-Crystalline Phase", *Appl. Phys. Lett.*, 2000, vol. 77 No. 3, pp. 406-408.

Sirringhaus et al., "High-Resolution Inkjet Printing of All-Polymer Transistor Circuits", *Science*, 2000, vol. 290, pp. 2123-2126.

Sotzing et al., "Electrochromic Conducting Polymers via Electrochemical Polymerization of Bis(2-(3,4-ethylenedioxy)thienyl) Monomers", *Chem. Mater.*, 8, pp. 882-889 (1996).

Spanggaard et al., "A Brief History of the Development of Organic and Polymeric Photovoltaics", *Solar Energy Materials and Solar Cells*, 2004, vol. 83, pp. 125-146.

Stokes et al., "New Phosphonic Acid Functionalized, Regioregular Polythiophenes", *Macromolecules*, 2003, 36, pp. 7114-7118.

Veres et al., "Air Stable, Amorphous Films and their Applications to Solution Processable Flexible Electronics", *Mater. Res. Soc. Symp. Proc.*, 2002, vol. 708.

Veres et al., "Low-*k* Insulators as the Choice of Dielectrics in Organic Field-Effect Transistors", *Adv. Funct. Mater.*, 2003, 13, pp. 199-204.

Veres et al., "Gate Insulators in Organic Field-Effect Transistors", *Chem. Mater.*, 2004, 16, pp. 4543-4555.

Vidal et al., "π-Conjugated Ligand Polymers Entwined Around Copper Centres", *Chem. Eur. J.*, 2000, 6, pp. 1663-1673.

Wei et al., "Synthesis and Electronic Properties of Aldehyde End-Capped Thiophene Oligomers and Other α,ω-Substituted Sexithiophenes", *Chem. Mater.*, 1996, vol. 8, pp. 2659-2666.

Wurthner et al., "Synthesis and Energy Transfer Properties of Terminally Substituted Oligothiophenes", *J. Am. Chem. Soc.*, 1995, vol. 117, pp. 8090-8099.

Zhai et al., "A Simple Method to Generate Side-Chain Derivatives of Regioregular Polythiophene via the GRIM Metathesis and Post-polymerization Functionalization", *Macromolecules*, 2003, 36, pp. 61-64.

Zhang et al., "Alkyl-Substituted Thieno[3,2-*b*]thiophene and Their Dimeric Subunits", *Macromolecules*, 2004, 37, pp. 6306-6315.

Zhu et al., "Conducting Polymetallorotaxanes: Metal Ion Mediated Enhancements in Conductivity and Charge Localization", *J. Am. Chem Soc.*, 1997, vol. 119, pp. 12568-12577.

Zhu et al., "Phenoxazine-Based Conjugated Polymers: A New Class of Organic Semiconductors for Field-Effect Transistors", *Macromolecules*, 2005, vol. 38, pp. 7983-7991.

U.S. Application entitled "6,13-Bis(thienyl)pentacene Compounds", filed on Jul. 29, 2005, having U.S. Appl. No. 11/192,950.

U.S. Application entitled "Perfluoroether Acyl Oligothiophene Compounds", filed on Mar. 9, 2005, having U.S. Appl. No. 11/076,268.

U.S. Application entitled "Bottom Gate Thin Film Transistors", filed on Dec. 28, 2005, having U.S. Appl. No. 11/275,367.

U.S. Application entitled "Electronic Devices Containing Acene-Thiophene Copolymers", filed Mar. 31, 2006, having U.S. Appl. No. 11/278,229.

U.S. Application entitled "Acene-Thiophene Copolymers", filed Mar. 31, 2006, having U.S. Appl. No. 11/278,222.

U.S. Application entitled "Electronic Devices Containing Acene-Thiophene Copolymers With Silethynly Groups", filed Apr. 21, 2006, having U.S. Appl. No. 11/379, 662.

Macromolecular Chemistry and Physics (2002), 203(1), 37-40 (Liu, Yunqi et al.) 2002.

* cited by examiner

ACENE-THIOPHENE COPOLYMERS WITH SILETHYNLY GROUPS

TECHNICAL FIELD

Acene-thiophene copolymers with attached silylethynyl groups are described.

BACKGROUND

Traditionally, inorganic materials have dominated the electronic device industry. For example, silicon arsenide and gallium arsenide have been used as semiconductor materials, silicon dioxide has been used as an insulator material, and metals such as aluminum and copper have been used as electrode materials. In recent years, however, there has been an increasing research effort aimed at using organic materials rather than the traditional inorganic materials in electronic devices. Among other benefits, the use of organic materials may enable lower cost manufacturing of electronic devices, may enable large area applications, and may enable the use of flexible circuit supports for display backplane and integrated circuits.

A variety of organic semiconductor materials have been considered, the most common being fused aromatic ring compounds as exemplified by small molecules such as pentacene-containing compounds, tetracene-containing compounds, anthracene-containing compounds, bis(acenyl)acetylene compounds, and acene-thiophene compounds. Several polymeric materials have also been considered such as regioregular polythiophenes exemplified by poly(3-alkylthiophene) and polymers having fused thiophene units or bis-thiophene units. However, at least some of the polymers tend to undergo oxidation, which can lead to diminished device performance.

SUMMARY OF THE INVENTION

Copolymeric materials are provided that can be used in electronic devices. More specifically, acene-thiophene copolymers with attached silylethynyl groups are described that can be used in one or more layers in electronic devices such as, for example, organic thin film transistors, light emitting diodes, and photovoltaic cells. These copolymers are soluble in many common organic solvents. That is, the copolymeric material can be part of a solvent-based coating composition.

In one aspect, an acene-thiophene copolymer that has attached silylethynyl groups is provided. The copolymer is of Formula I.

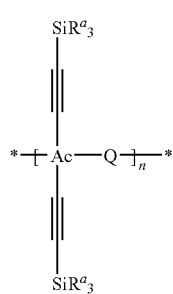

I

In this formula, Ac is a radical of an acene having two to five fused benzene rings that optionally can be substituted with a substituent selected from an alkyl, alkoxy, thioalkyl, aryl, aralkyl, halo, haloalkyl, hydroxyalkyl, heteroalkyl, alkenyl, or combinations thereof. Each $R^a$ is independently selected from hydrogen, alkyl, alkoxy, alkenyl, aryl, heteroaryl, aralkyl, heteroaralkyl, heteroalkyl, or hydroxyalkyl. Q is a divalent group of Formula II, III, IV, or V

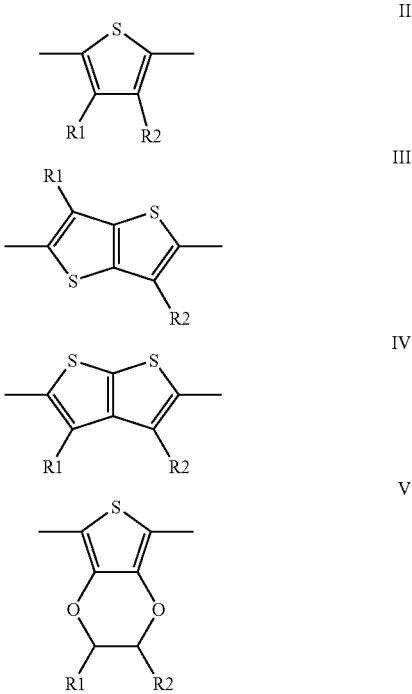

where R1 and R2 are each independently selected from hydrogen, alkyl, alkoxy, thioalkyl, aryl, aralkyl, halo, haloalkyl, hydroxyalkyl, heteroalkyl, or alkenyl. The subscript n is an integer greater than or equal to 4. The asterisks in Formula I indicate the locations of attachment to another group such as another repeat unit of formula —Ac(E)$_2$—Q— where E is the silylethynyl group of formula —C≡C—Si(R$^a$)$_3$.

In another aspect, a composition is provided that includes a solvent and an acene-thiophene copolymer of Formula I.

The above summary of the present invention is not intended to describe each disclosed embodiment or every implementation of the present invention. The Detailed Description and Examples that follow more particularly exemplify these embodiments.

DETAILED DESCRIPTION OF THE INVENTION

The present invention provides acene-thiophene copolymers that have attached silylethynyl groups. The acene-thiophene copolymers can be included in one or more layers of electronic devices. For example, the acene-thiophene copolymers can be used as a semiconducting material in electronic devices such as organic thin film transistors or can be positioned between two electrodes in electronic devices such as an organic photovoltaic cell or an organic electroluminescent device.

As used herein, the terms "a", "an", and "the" are used interchangeably with "at least one" to mean one or more of the elements being described.

"Acene" refers to a polycyclic aromatic hydrocarbon group having at least 2 fused benzene rings in a rectilinear arrangement as shown by the following formula where m is an integer equal to or greater than zero.

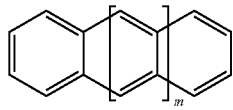

The acene is typically selected from naphthalene, anthracene, tetracene, or pentacene.

The terms "acene-thiophene copolymer", "acene-thiophene copolymer with attached silylethynyl groups", and "acene-thiophene with silylethynyl groups" are used interchangeably to refer to a copolymer of Formula I.

"Alkyl" refers to a monovalent group that is a radical of an alkane, which is a saturated hydrocarbon. The alkyl can be linear, branched, cyclic, or combinations thereof and typically contains 1 to 30 carbon atoms. In some embodiments, the alkyl group contains 4 to 30, 1 to 20, 4 to 20, 1 to 14, 1 to 10, 4 to 10, 4 to 8, 1 to 8, 1 to 6, or 1 to 4 carbon atoms. Examples of alkyl groups include, but are not limited to, methyl, ethyl, n-propyl, iso-propyl, n-butyl, tert-butyl, iso-butyl, n-pentyl, n-hexyl, cyclohexyl, n-octyl, n-heptyl, and ethylhexyl.

"Alkenyl" refers to a monovalent group that is a radical of an alkene, which is a hydrocarbon with at least one carbon-carbon double bond. The alkenyl can be linear, branched, cyclic, or combinations thereof and typically contains 2 to 30 carbon atoms. In some embodiments, the alkenyl contains 2 to 20, 2 to 14, 2 to 10, 4 to 10, 4 to 8, 2 to 8, 2 to 6, or 2 to 4 carbon atoms. Exemplary alkenyl groups include ethenyl, propenyl, and butenyl.

"Alkynyl" refers to a monovalent group that is a radical of an alkyne, a hydrocarbon with at least one carbon-carbon triple bond. The alkynyl can be linear, branched, cyclic, or combinations thereof and typically contains 2 to 30 carbon atoms. In some embodiments, the alkynyl contains 2 to 20, 2 to 14, 2 to 10, 4 to 10, 4 to 8, 2 to 8, 2 to 6, or 2 to 4 carbon atoms. Exemplary alkynyl groups include ethynyl, propynyl, and butynyl. Some alkynyl groups such as an ethynyl can be further substituted with a silyl group.

"Alkoxy" refers to a monovalent group of formula —OR where R is an alkyl group. Examples include, but are not limited to, methoxy, ethoxy, propoxy, and butoxy.

"Aryl" refers to a monovalent group that is a radical of an aromatic carbocyclic compound. The aryl can have one aromatic ring or can include up to 5 carbocyclic ring structures that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

"Aralkyl" refers to an alkyl substituted with an aryl group.

"Halo" refers to a halogen group (i.e., —F, —Cl, —Br, or —I).

"Haloalkyl" refers to an alkyl that is substituted with one or more halo groups.

"Hydroxyalkyl" refers to an alkyl that is substituted with one or more hydroxy groups.

"Heteroalkyl" refers to an alkyl having one or more —$CH_2$— groups replaced with a thio, oxy, a group of formula —$NR^b$— where $R^b$ is hydrogen or alkyl, or aryl, or a group of formula —$SiR_2$— where R is an alkyl. The heteroalkyl can be linear, branched, cyclic, or combinations thereof and can include up to 30 carbon atoms and up to 20 heteroatoms. In some embodiments, the heteroalkyl includes up to 25 carbon atoms, up to 20 carbon atoms, up to 15 carbon atoms, or up to 10 carbon atoms. Thioalkyl groups and alkoxy groups are subsets of heteroalkyl groups.

"Heteroaryl" refers to a monovalent radical having a five to seven member aromatic ring that includes one or more heteroatoms independently selected from S, O, N, or combinations thereof in the ring. Such a heteroaryl ring can be connected to or fused to up to five ring structures that are aromatic, aliphatic, or combinations thereof. Examples of heteroaryl groups include, but are not limited to, furanyl, thiophenyl, pyrrolyl, imidazolyl, pyrazolyl, triazolyl, tetrazolyl, thiazolyl, oxazolyl, isoxazolyl, oxadiazolyl, thiadiazolyl, isothiazolyl, pyridinyl, pyridazinyl, pyrazinyl, pyrimidinyl, quinolinyl, isoquinolinyl, benzofuranyl, benzothiophenyl, indolyl, carbazoyl, benzoxazolyl, benzothiazolyl, benzimidazolyl, cinnolinyl, quinazolinyl, quinoxalinyl, phthalazinyl, benzothiadiazolyl, benzotriazinyl, phenazinyl, phenanthridinyl, acridinyl, and indazolyl, and the like.

"Heteroaralkyl" refers to an alkyl substituted with a heteroaryl.

"Silylethynyl" refers to a monovalent group of formula —C≡C—Si($R^a$)$_3$ where $R^a$ is independently selected from hydrogen, alkyl, alkoxy, alkenyl, heteroalkyl, hydroxyalkyl, aryl, aralkyl, heteroaryl, or heteroaralkyl. These groups are sometimes referred to as silanylethynyl groups.

"Thioalkyl" refers to a monovalent group of formula —SR where R is an alkyl group.

An acene-thiophene copolymer that has attached silylethynyl groups is provided. The copolymer is of Formula I.

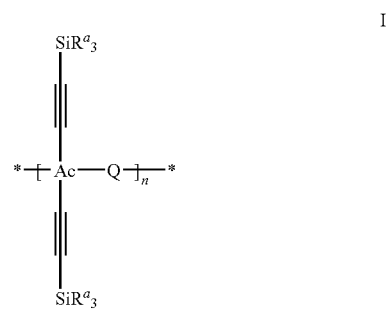

In this formula, Ac is a radical of an acene having two to five fused benzene rings that optionally can be substituted with a substituent selected from an alkyl, alkoxy, thioalkyl, aryl, aralkyl, halo, haloalkyl, hydroxyalkyl, heteroalkyl, alkenyl, or combinations thereof. Each Ac group has two covalently attached silylethynyl groups of formula —C≡C—Si($R^a$)$_3$ where each $R^a$ is independently selected from hydrogen, alkyl, alkoxy, alkenyl, aryl, heteroaryl, aralkyl, heteroaralkyl, heteroalkyl, or hydroxyalkyl. Group Q is a divalent group of Formula II, III, IV, or V.

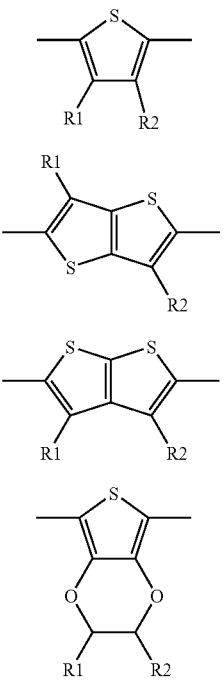

R1 and R2 are each independently selected from hydrogen, alkyl, alkoxy, thioalkyl, aryl, aralkyl, halo, haloalkyl, hydroxyalkyl, heteroalkyl, or alkenyl. The subscript n is an integer greater than or equal to 4. The asterisks in Formula I indicate the locations of attachment to another group such as another repeat unit of formula —Ac(E)$_2$—Q— where each E is a silylethynyl group of formula —C≡C—Si(R$^a$)$_3$.

The Ac group is a radical of an acene. The acene can have two to five fused aromatic rings arranged in a rectilinear manner (i.e., naphthalene, anthracene, tetracene, or pentacene). Suitable acenes are often selected from naphthalene, anthracene, or pentacene. Acenes are commonly given a numbering sequence in which each carbon atom that is a member of only one ring is numbered. Various positions of exemplary acene-diyls (i.e., divalent radicals of an acene) are shown in the following structures for naphthylene-2,6-diyl,

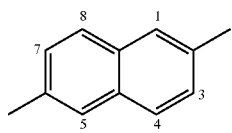

anthracene-2,6-diyl, and

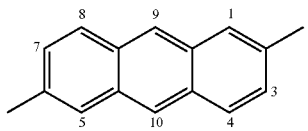

pentacene-2,9-diyl.

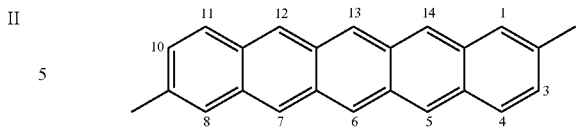

Each Ac group has two covalently attached silylethynyl groups of formula —C≡C—Si(R$^a$)$_3$. When the Ac group is derived from naphthalene, the two silylethynyl groups are typically attached to the same aromatic ring. When the Ac group is derived from anthracene or pentacene, the two silylethynyl groups can both be attached to the same inner aromatic ring or one silylethynyl group can be attached to each of the outer aromatic rings. As used herein, the term "inner aromatic ring" refers to an aromatic ring of an acene that is fused to two other aromatic rings. For example, the ring containing the 9 and 10 positions is referred to as the inner aromatic ring for an Ac group based on anthracene. As used herein, the term "outer aromatic ring" refers to an aromatic ring of an acene that is fused to only one aromatic ring. For example, the ring containing the 1, 2, 3, and 4 positions and the ring containing the 5, 6, 7, and 8 positions are referred to as the outer aromatic rings for an Ac group based on anthracene.

In many embodiments, it is preferable that the silylethynyl groups are attached to an inner ring of the Ac group. For example, if the Ac group is derived from anthracene, the silylethynyl groups are preferably attached at the 9 and 10 positions. The stability of the acene precursor used to prepare the copolymers can often be improved by attachment of the silylethynyl groups to an inner aromatic ring of the Ac group. With multiple inner aromatic rings, attachment of the silylethynyl groups to the inner most ring, such as at the 6 and 13 positions of an Ac group derived from pentacene, may result in the greatest stability of the acene precursor. As used herein, stability refers to resistance to oxidation and/or dimerization.

Each silylethynyl group is of formula —C≡C—Si—(R$^a$)$_3$ where each R$^a$ independently is hydrogen, alkyl, alkoxy, alkenyl, heteroalkyl, hydroxyalkyl, aryl, heteroaryl, aralkyl, or heteroaralkyl. Exemplary alkyl, alkoxy, alkenyl, heteroalkyl, and hydroxyalkyl groups can be linear, branched, cyclic, or a combination thereof and usually have up to 10 carbon atoms, up to 8 carbon atoms, up to 6 carbon atoms, or up to 4 carbon atoms. An exemplary aryl group is phenyl and an exemplary aralkyl is an alkyl having up to 10 carbon atoms that is substituted with a phenyl group. Exemplary heteroaryl groups often have a 5 or 6 membered unsaturated, heterocyclic ring that includes 1 or 2 heteroatoms and an exemplary heteroaralkyl is an alkyl having up to 10 carbon atoms that is substituted with a 5 or 6 membered heteroaryl having 1 or 2 heteroatoms.

In more specific examples, each R$^a$ is an alkyl having up to 10, up to 8, or up to 6, carbon atoms. That is, the silylethynyl group is a trialkylsilylethynyl group. Each alkyl group often has at least 1 carbon atom, at least 2 carbon atoms, or at least 3 carbon atoms. For example, in some copolymers of Formula I, the silylethynyl group is triisopropylsilylethynyl where R$^a$ is isopropyl.

In addition to the two silylethynyl groups, the Ac group can be optionally substituted with a substituent selected from an alkyl, alkoxy, thioalkyl, aryl, aralkyl, halo, haloalkyl, hydroxyalkyl, heteroalkyl, alkenyl, or combinations thereof. When referring to Ac substituents, the term "combinations thereof" can refer either to multiple substituents on the Ac group or to a first substituent that is further substituted with a second substituent. At least in some embodiments, the addition of one or more substituents can increase the solubility of the copolymer of Formula I in organic solvents or can improve the compatibility of the copolymer with various coating compositions.

Group Q can be attached to any position of Ac that lacks an attached silylethynyl group. The acene-thiophene copolymer of Formula I lacks a bithiophene or polythiophene group. That is, any two $Ac(E)_2$ groups are separated by a group Q selected from a single group of Formula II to V. The copolymer is usually conjugated throughout the length of the copolymer. There are typically no spacer groups between two repeat units of formula —$Ac(E)_2$—Q— in the copolymer that can disrupt the conjugation of double bonds along the backbone of the copolymer.

In many embodiments, Q is attached to an outer aromatic ring of Ac. For example, group Q can be attached at positions 1, 2, 3, 4, 5, 6, 7, or 8 for an Ac group based on either naphthalene or anthracene and at positions 1, 2, 3, 4, 8, 9, 10, or 11 for an Ac group based on pentacene. When Q is attached to an outer aromatic ring of Ac and the Ac group is derived from anthracene or pentacene, the two silylethynyl groups are usually attached to an inner aromatic ring of Ac and preferably to the same inner aromatic ring.

In other embodiments, Q is attached to an inner aromatic ring of Ac. For example, group Q can be attached at positions 9 or 10 for an Ac group based on anthracene or at positions 5, 6, 7, 12, 13, or 14 for an Ac group based on pentacene. When Q is attached to an inner aromatic ring of Ac, the two silylethynyl groups are usually attached to an outer aromatic ring of Ac. For example, one silylethynyl group can be positioned on each of the outer aromatic rings for an Ac group derived from anthracene or pentacene.

In addition to being attached to group Q and to two silylethynyl, the Ac group is attached to a fourth group such as an end group of the copolymer or another repeat unit of formula —$Ac(E)_2$—Q— where E refers to the silylethynyl groups (i.e., the resulting copolymeric material has a subscript n equal to at least 5). If group Q in Formula I is attached to an inner aromatic ring of the Ac group, the fourth group is often attached to the same inner aromatic ring. If group Q is attached to an outer aromatic ring of the Ac group, the fourth group is often attached to the opposite outer aromatic ring. That is, group Q and the fourth group are often attached to opposite distal ends of the Ac group with the two silylethynyl groups attached to an inner aromatic ring of the Ac group.

Exemplary $Ac(E)_2$ groups include, but are not limited to, 1,4-bis(silylethynyl)naphthalene-2,6-diyl, 1,4-bis(silylethynyl)naphthalene-2,7-diyl, 9,10-bis(silylethynyl)anthracene-2,6-diyl, 9,10-bis(silylethynyl)anthracene-2,7-diyl, 2,6-bis(silylethynyl)anthracene-9,10-diyl, 2,7-bis(silylethynyl)anthracene-9,10-diyl, 6,13-bis(silylethynyl)pentacene-2,9-diyl, 6,13-bis(silylethynyl)pentacene-2,10-diyl, 2,9-bis(silylethynyl)pentacene-6,13-diyl, or 2,10-bis(silylethynyl)pentacene-6,13-diyl. Any of these groups can optionally have the Ac group substituted with an alkyl, alkoxy, thioalkyl, aryl, aralkyl, halo, haloalkyl, hydroxyalkyl, heteroalkyl, alkenyl, or combinations thereof. The position numbers in front of the term "diyl" indicate the carbon atom where the Q group and the fourth group are attached to the Ac group.

Some more specific $Ac(E)_2$ groups include, but are not limited to, 1,4-bis(trialkylsilylethynyl)naphthalene-2,6-diyl, 1,4-bis(trialkylsilylethynyl)naphthalene-2,7-diyl, 9,10-bis(trialkylsilylethynyl)anthracene-2,6-diyl, 9,10-bis(trialkylsilylethynyl)anthracene-2,7-diyl, 2,6-bis(trialkylsilylethynyl)anthracene-9,10-diyl, 2,7-bis(trialkylsilylethynyl)anthracene-9,10-diyl, 6,13-bis(trialkylsilylethynyl)pentacene-2,9-diyl, 6,13-bis(trialkylsilylethynyl)pentacene-2,10-diyl, 2,9-bis(trialkylsilylethynyl)pentacene-6,13-diyl, or 2,10-bis(trialkylsilylethynyl)pentacene-6,13-diyl. Any of these groups can optionally have the Ac group substituted with an alkyl, alkoxy, thioalkyl, aryl, aralkyl, halo, haloalkyl, hydroxyalkyl, heteroalkyl, alkenyl, or combinations thereof. The position numbers in front of the term "diyl" indicate the carbon atom where the Q group and the fourth group are attached to the Ac group.

In some applications such as those in which the copolymers function as semiconductor materials, it may be desirable to select an Ac group that has an extended conjugation length in a linear direction (i.e., along the backbone of the copolymer). Such copolymers tend to align well with each other in the formation of stack-like structures. That is, in some applications, it is preferable that the Q group is attached to an outer aromatic ring of the acene with the two silylethynyl groups attached to an inner aromatic ring, if there is an inner aromatic ring. Exemplary $Ac(E)_2$ groups include, but are not limited to, 1,4-bis(silylethynyl)naphthalene-2,6-diyl such as 1,4-bis(trialkylsilylethynyl)naphthalene-2,6-diyl, 9,10-bis(silylethynyl)anthracene-2,6-diyl such as 9,10-bis(trialkylsilylethynyl)anthracene-2,6-diyl, or 6,13-bis(silylethynyl)pentacene-2,9-diyl such as 6,13-bis(trialkylsilylethynyl)pentacene-2,9-diyl. Any of these groups can optionally have the Ac group substituted with an alkyl, alkoxy, thioalkyl, aryl, aralkyl, halo, haloalkyl, hydroxyalkyl, heteroalkyl, alkenyl, or combinations thereof.

Group Q is selected from Formula II to V as described above. Each group R1 and R2 in these formulas is independently selected from hydrogen, alkyl, alkoxy, thioalkyl, aryl, aralkyl, halo, haloalkyl, hydroxyalkyl, heteroalkyl, alkenyl, or combinations thereof. When referring to groups R1 and R2, the term "combinations thereof" refers to a first group that is further substituted with another group.

In some embodiments of group Q, there is at least one R1 group or R2 group that contains at least 4 carbon atoms such as 4 to 30 carbon atoms, 4 to 20 carbon atoms, 4 to 16 carbon atoms, or 4 to 10 carbon atoms. More specifically, there is at least one R1 group or R2 group selected from an alkyl having at least 4 carbon atoms, an alkoxy having at least 4 carbon atoms, a thioalkyl having at least 4 carbon atoms, an aryl having at least 6 carbon atoms, an aralkyl having at least 10 carbon atoms, a haloalkyl having at least 4 carbon atoms, a hydroxyalkyl having at least 4 carbon atoms, a heteroalkyl having at least 4 carbon atoms, an alkenyl having at least 4 carbon atoms, or combinations thereof. The selection of at least one such group can often increase the solubility of the copolymer of Formula I in common organic solvents or can often improve the compatibility of the acene-thiophene copolymer with various coating compositions.

Some exemplary copolymers have identical R1 and R2 groups selected from an alkyl having at least 4 carbon atoms, an alkoxy having at least 4 carbon atoms, a thioalkyl having at least 4 carbon atoms, an aryl having at least 6 carbon atoms, an aralkyl having at least 10 carbon atoms, a haloalkyl having at least 4 carbon atoms, a hydroxyalkyl having at least 4 carbon atoms, a heteroalkyl having at least 4 carbon atoms, an alkenyl having at least 4 carbon atoms, or a combination thereof.

The copolymers of Formula I can be prepared using Suzuki coupling reactions as shown in Reaction Scheme A.

Reaction Scheme A

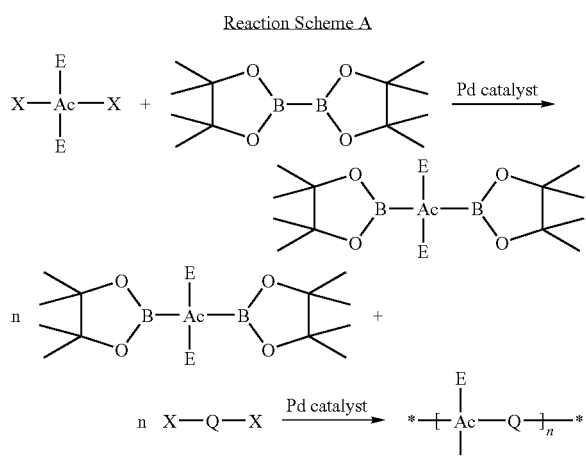

A dihaloacene having two attached silylethynyl groups (i.e., Ac represents the acene group, E represents the group of formula —C≡C—Si($R^a$)$_3$, and X represent a halo) is initially reacted with a dioxaborolane such as bis(pinacolato)diboron to form an acene compound having two dioxaborolane groups (e.g., tetramethyldioxaborolane). The resulting acene compound is then reacted with a dihalothiophene compound (i.e., X-Q-X) to form the copolymer of Formula I. The halo groups in the second reaction can be the same or different than the halo groups in the first reaction. Both of these reactions typically take place in the presence of a palladium catalyst such as, for example, [1,1'-bis(diphenylphosphino)ferrocene] dichloropalladium and tetrakis(triphenyl)phosphine)palladium(0). As an alternative to Reaction Scheme A, a dihalothiophene compound can be initially reacted with a dioxaborolane and then reacted using Suzuki coupling reactions with a dihaloacene having two attached silylethynyl groups. Suzuki coupling reactions are further described in the article by Ito et al., *Angew. Chem., Int. Ed.*, 42, 1159-1162 (2003) and supporting information referenced therein.

Stille coupling reactions can also be used to synthesize the copolymers of Formula I as shown in Reaction Scheme B.

Reaction Scheme B

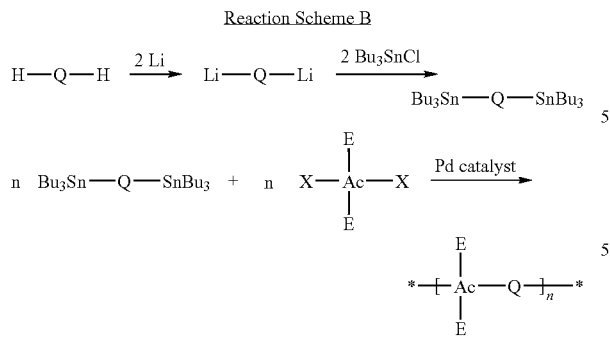

A thiophene compound can be lithiated and then reacted with a trialkylstannate such as tributyltin chloride to form a thiophene compound substituted with two trialkylstannate groups. The resulting thiophene compound can then be reacted in the presence of a palladium catalyst with a dihaloacene having two attached silylethynyl groups. As an alternative to Reaction Scheme B, an acene with two attached silylethynyl groups can be lithiated and then reacted with a trialkylstannate to form an acene substituted with two trialkylstannate groups. The resulting acene compound can then be reacted with a dihalothiophene in the presence of a palladium catalyst. Stille coupling reactions are further described in the articles Miller et al., *J. Org. Chem.*, 60, 6813-6819 (1995) and Katz et al., *Acc. Chem. Res.*, 34, 359-369 (2001).

Dihaloacenes having two silylethynyl groups can be synthesized from a dihaloacene as shown in the Examples Section or as shown in Reaction Scheme C. For example, 1,4-bis (silylethynyl)-2,6-dihalonaphthalene can be synthesized starting with 2,6-dihalonaphthlene such as 2,6-dichloronaphthalene, which is commercially available from Apin Chemicals Ltd., Oxfordshire, UK.

Reaction Scheme C

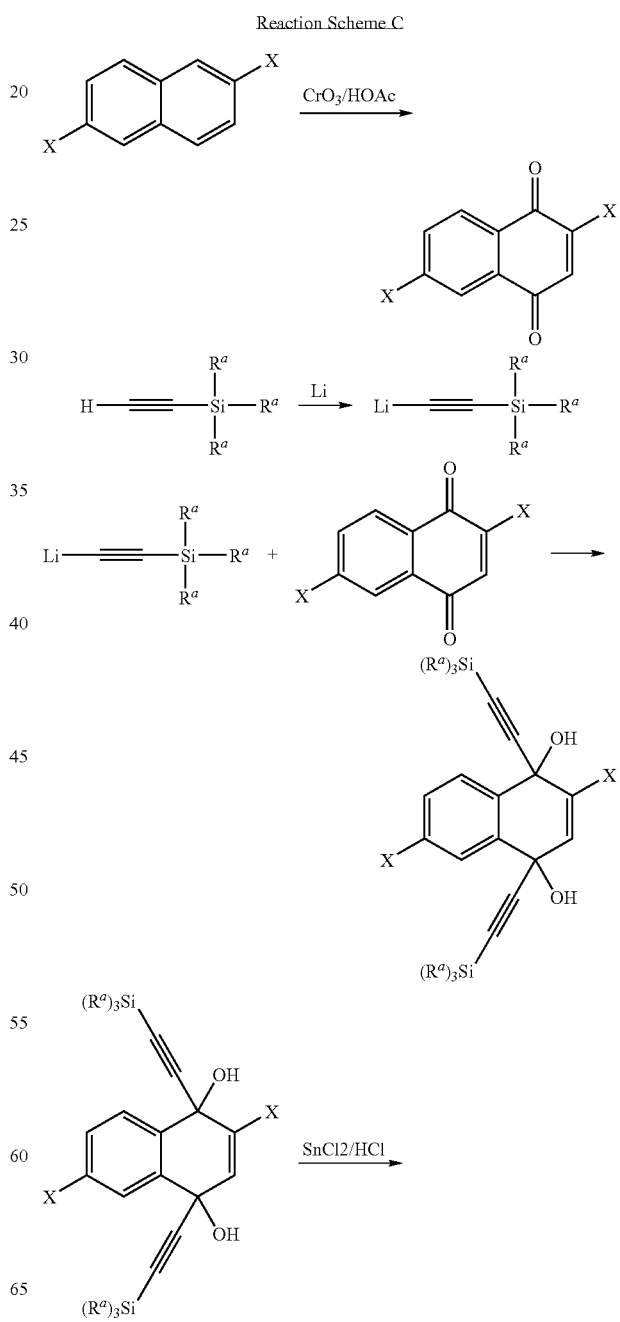

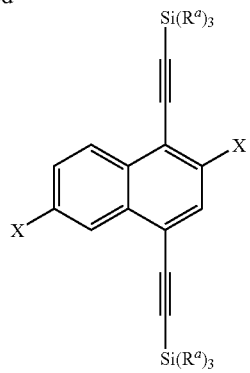

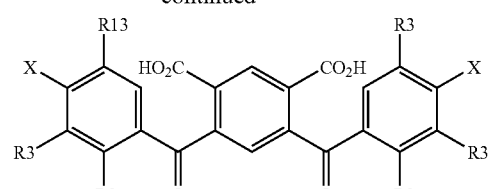

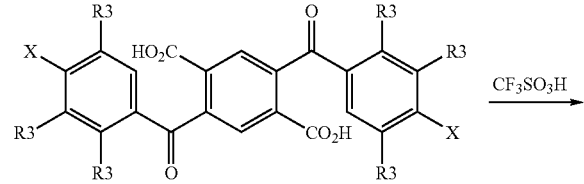

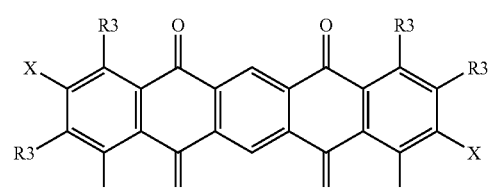

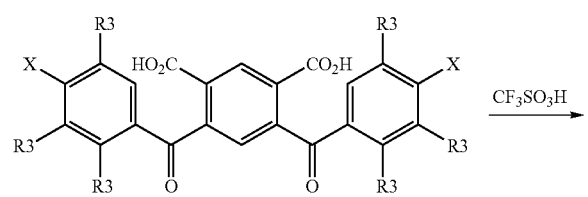

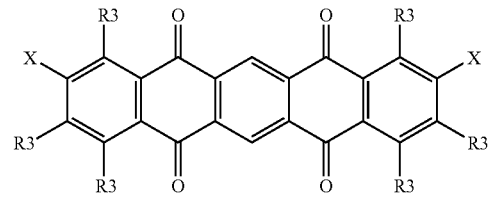

The 2,6-dihalonaphthalene can be oxidized to 2,6-dihalonaphthaquinone. The silylethynyl groups can be added by formation of a lithiated version of silylacetylene compounds followed by reaction with the 2,6-dihalonaphthaquinone. Various silylacetylene compounds are commercially available. For example, (trimethylsilyl)acetylene, (triethylsilyl)acetylene, (triisopropylsilyl)acetylene, and (tert-butyldimethylsilyl)acetylene are available from GFS Chemicals, Columbus, Ohio. (Dimethylphenylsilyl)acetylene, (methyldiphenylsilyl)acetylene, and (triphenylsilyl)acetylene are available from Aldrich Chemical Co., Milwaukee, Wis. The resulting diol product can then be converted to the corresponding aromatic compound by reaction with a reducing agent such as stannous chloride.

Dihalopentacenes with the halo group in the 2, 9 or 2, 10 positions can be synthesized as shown in Reaction Scheme D. The reaction of a halobenzene with pyromellitic anhydride under typical Friedel-Crafts conditions (e.g., AlCl₃, which is a strong Lewis Acid) in an inert solvent or with halobenzene as solvent with heat gives the two isomeric bis(halobenzoyl) phthalic acids A and B. These isomers can be separated by fractional recrystallization, chromatography or by differences in solubility. Further reactions of the individual bis(halobenzoyl)phthalic acids A and B are carried on separately first by cyclization to the corresponding tetrones C and D using triflic acid followed by reduction to the desired pentacenes E and F with sodium borohydride and stannous chloride. The R3 groups below are hydrogen or substituent groups.

Reaction Scheme D

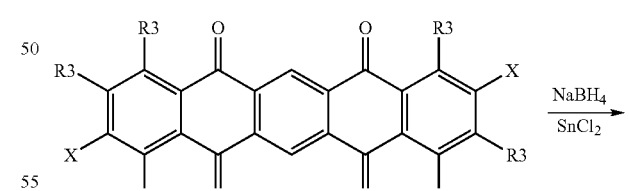

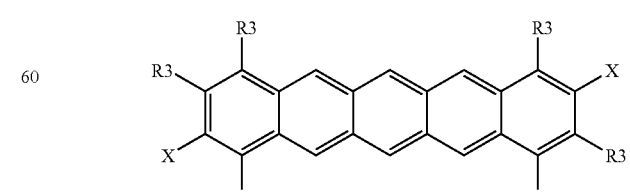

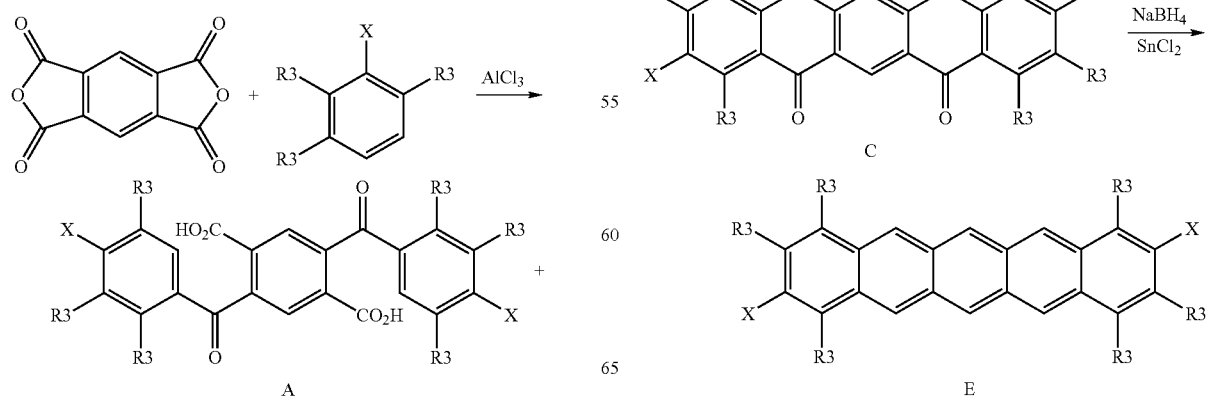

-continued

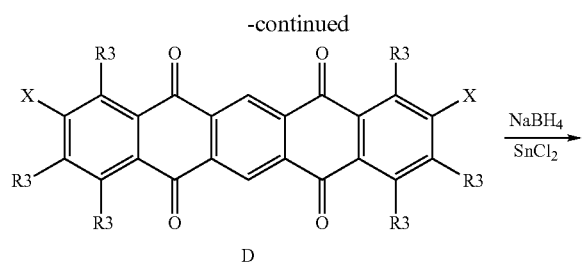
D

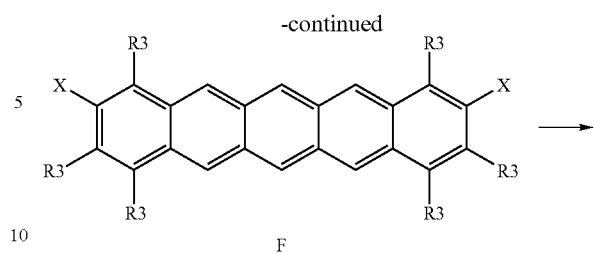
F

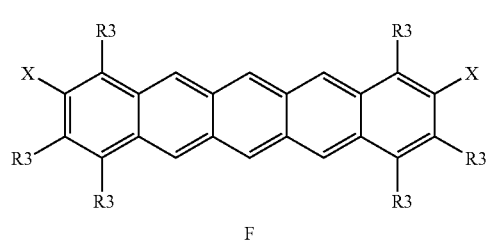
F

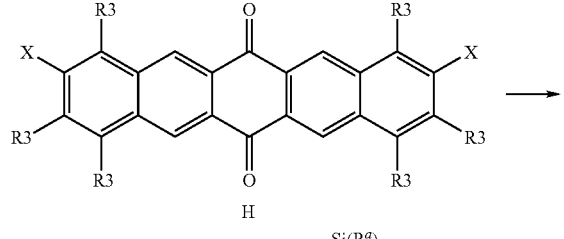
H

The resulting dihalopentacenes can be reacted to attach two silylethynyl groups using a method analogous to that shown in Reaction Scheme C. Oxidation of compounds E and F would give the corresponding quinones G and H respectively. These compounds compounds could then be converted to derivatives with the silylethynyl groups attached at the 6 and 13 positions of the pentacene.

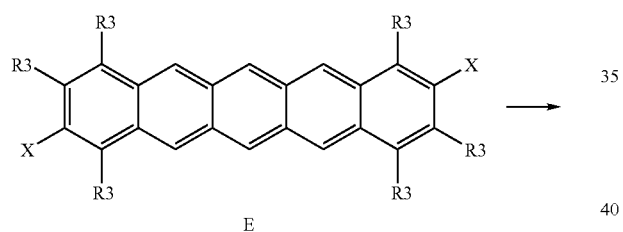
E

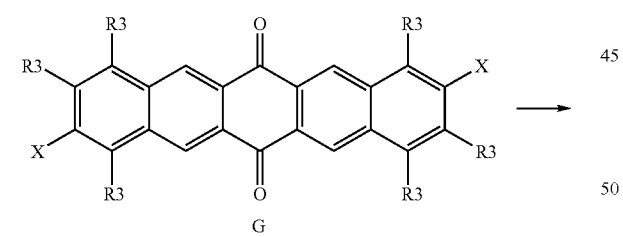
G

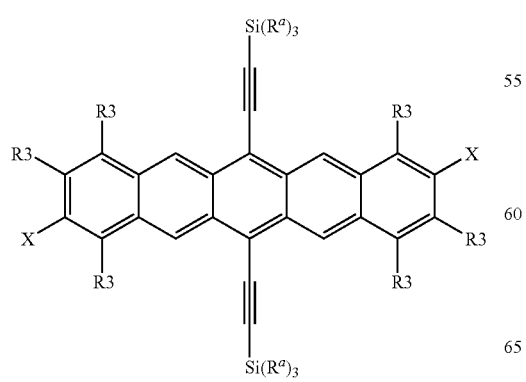

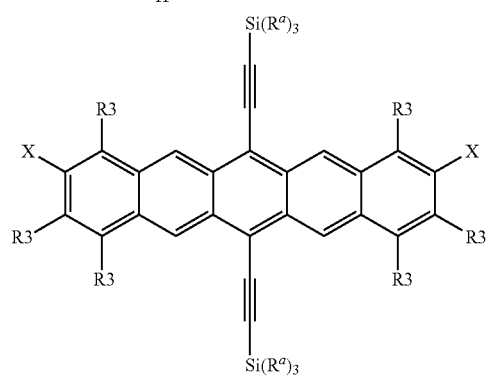

Dibromothiophene compounds of Formula IIa

IIa

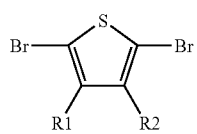

can be prepared by bromination of the corresponding thiophene compound. That is, the corresponding thiophene can be reacted with a brominating agent such as N-bromosuccinimide (NBS). For example, a compound of Formula Ia with R1 and R2 equal to alkyl groups can be prepared by reacting a 3,4-dihalothiophene with two moles of a Grignard reagent containing the desired alkyl groups followed by a bromination reaction. This method is further described in the article by Vidal et al., *Chem. Eur. J.*, 6, 1663-1673 (2000).

Dihalothieno[3,2-b]thiophenes of Formula IIIa

IIIa

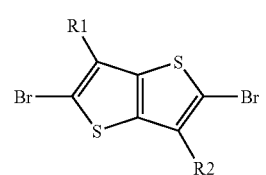

can be prepared by bromination of the corresponding thieno[3,2-b]thiophenes. Some thieno[3,2-b]thiophenes are commercially available from Maybridge, Cornwall, UK. 3,6-dimethylthieno[3,2-b]thiophene is available from Synchem OHG, Kassel, Germany and 2,5-dibromothieno[3,2-b]thiophene is available from Aldrich, Milwaukee, Wis. Other thieno[3,2-b]thiophenes can be synthesized as described in the article by Zhang et al., Macromolecules, 37, 6306-6315 (2004).

Dihalothieno[2,3-b]thiophenes of Formula IVa

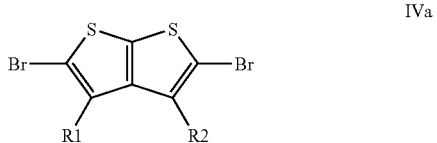

IVa can be prepared by bromination of the corresponding thieno[2,3-b]thiophenes. 3,4-dimethylthieno[2,3-b]thiophene is commercially available from Alfa Aesar Johnson Mathey, Ward Hill, Mass. Other substituted thieno[2,3-b]thiophenes can be prepared using an analogous reaction to that described in the article by Comel et. al, Journal of Heterocyclic Chemistry, 38, 1167-1171 (2001).

Likewise, dihaloethylenedioxythiophene compounds of Formula Va

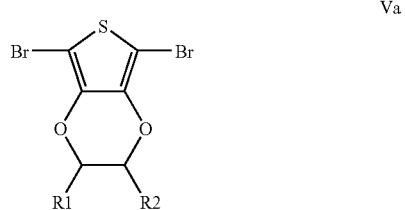

Va can be prepared by bromination of the corresponding ethylenedioxythiophenes. The corresponding ethylenedioxythiophenes can be prepared, for example, by transesterificative cyclocondensation of commercially available 3,4-dimethoxythiophenes with geminal diols such as 2,3-butanediol, 1,2-propanediol, and the like in the presence of an acid catalyst such as p-toluenesulfonic acid. The resulting 3,4-disubstituted thiophene can then be dibrominated at the 2 and 5 positions with N-bromosuccinimide or other suitable brominating agents. This method is further described in the article by Nielson et al, Macromolecules, 38, 10379 (2005).

The copolymers of Formula I typically have a weight average molecular weight of at least 5,000 g/mole. In some embodiments, the weight average molecular weight is at least 7,000 g/mole, at least 8,000 g/mole, at least 10,000 g/mole, at least 12,000 g/mole or at least 15,000 g/mole. The weight average molecular weight can be determined using Gel Permeation Chromatography.

If desired, the purity of the copolymeric material can be increased using techniques known in the art such as additional precipitation steps or Soxhlet extraction.

In another aspect, a composition is provided that includes a solvent and an acene-thiophene copolymer of Formula I. Suitable solvents include, but are not limited to, aromatic solvents such as toluene, benzene, and xylene; ethers such as tetrahydrofuran and dioxane; ketones such as methyl isobutyl ketone and methyl ethyl ketone; chlorinated solvents such as chloroform, dichloromethane, chlorobenzene, and dichlorobenzene; alkanes such as cyclohexane and heptane; and amides such as N,N-dimethylformamide and 1-methylpyrrolidone. At least some of the acene-thiophene copolymers of Formula I are soluble in these solvents. As used herein, the term "soluble" means the copolymer can be dissolved in a solvent to provide a solution that contains at least 0.05 weight percent copolymer based on the weight of the solution. Some copolymers have a solubility of at least 0.05 weight percent, at least 0.1 weight percent, at least 0.2 weight percent, at least 0.5 weight percent, at least 1 weight percent, at least 2 weight percent, at least 3 weight percent, or at least 5 weight percent based on the weight of the solution.

The compositions can be used to provide a coating by application of the compositions to a surface such as to the surface of a substrate or to a surface of a layer in an electronic device. The coating can be applied using any suitable application technique such as, for example, spray coating, spin coating, dip coating, knife coating, gravure coating, inkjet printing, and transfer printing. The solvent can be removed from the coating after application by evaporating under ambient conditions (e.g., at about 20° C. to about 25° C.) or by drying at an elevated temperatures such as a temperature up to about 200° C., up to about 150° C., up to about 120° C., up to about 100° C., or up to about 80° C. In contrast, many other known organic semiconductor materials such as pentacene need to be vacuum deposited.

The acene-thiophene copolymers and solutions containing these copolymers tend to be stable for at least several days without special atmospheric protection and without special protection from light. In contrast, polythiophenes are not stable in solution and/or when exposed to air.

The foregoing describes the invention in terms of embodiments foreseen by the inventors for which an enabling description was available, notwithstanding that insubstantial modifications of the invention, not presently foreseen, may nonetheless represent equivalents thereto.

EXAMPLES

All reagents were purchased from commercial sources and used without further purification unless otherwise noted. Sodium carbonate, tetrakis(triphenylphosphine)palladium (0), tin (II) chloride, bis(pinacollato)diboron, 2,5-dibromothiophene, and 2,5-dibromo3-hexylthiophene were purchased from Aldrich (Milwaukee, Wis.); ALIQUAT 336 (a phase transfer catalyst), n-butyl lithium, and [1,1'-bis(diphenylphosphino)ferrocene]dichloropalladium complex with dichloromethane were obtained from Alfa Aesar (Ward Hill, Mass.); and triisopropylsilylacetylene was purchased from GFS Chemicals (Columbus, Ohio), Hexane and tetrahydrofuran (THF) were distilled over sodium. The following starting materials were prepared using published procedures as follows:

2,6-dibromoanthraquinone was prepared from commercially available 2,6-diaminoanthraquinone (Sigma Aldrich) as described by Ito et al., Angew. Chem. Int. Ed., 42, 1159-1162 (2003). After sublimation, it was further purified by recrystallization from DMF.

2,5-dibromo-3,4-dihexylthiophene was prepared from commercially available 3,4-dibromothiophene (Alfa Aesar) as described by Vidal et al., Chem. Eur. J., 6, 1663-1673 (2000).

2,5-Dibromo-3,4-ethylenedioxythiophene was prepared from commercially available 3,4-ethylenedioxythiophene (EDOT, Bayer, Leverkusen, Germany) as described by Sotzing et al., *Chem. Mater.*, 8, 882-889 (1996).

2,5-Dibromo-3,6-dinonylthieno[3,2-b]thiophene was prepared by bromination of 3,6-dinonylthieno[3,2-b]thiophene using N-bromosuccinimide. 3,6-Dinonylthieno[3,2-b]thiophene was obtained from 3,4-dibromothiophene in a multistep synthesis as described by Zhang et al., *J. Macromolecules*, 37, 6306-6315 (2004).

The precursor 2,6-bis-(4,4,5,5-tetramethyl-1,3,2-dioxaborolan-2-yl)-9,10-bis-[(triisopropylsilyl)ethynyl]anthracene was synthesized according to Reaction Scheme 1, as described in Preparatory Examples 1 and 2.

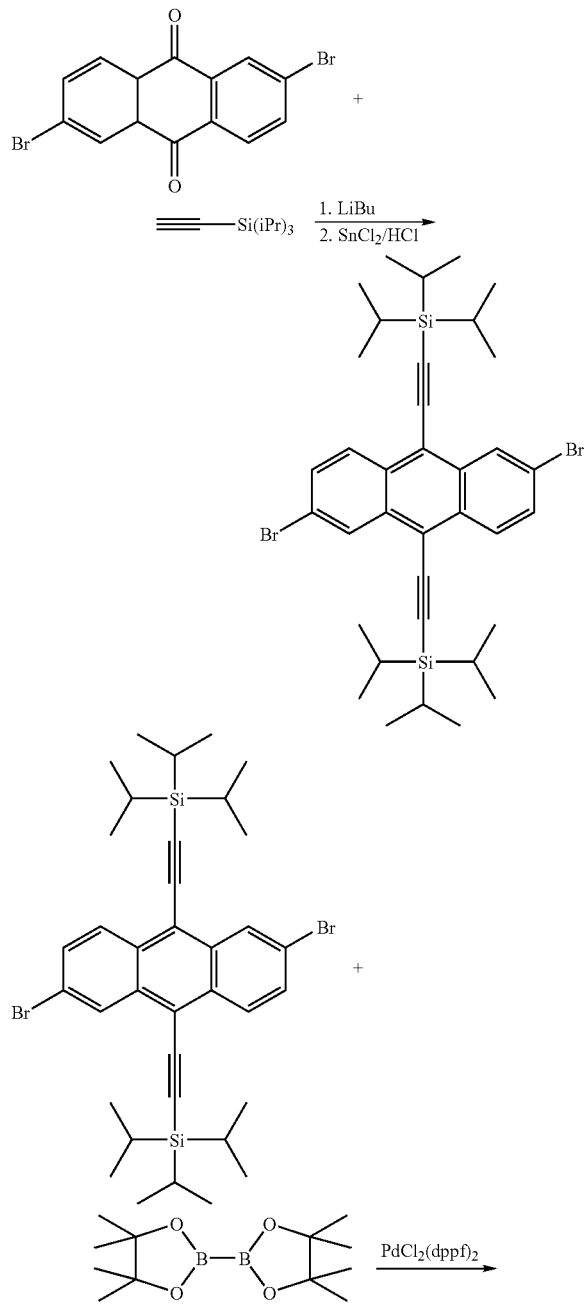

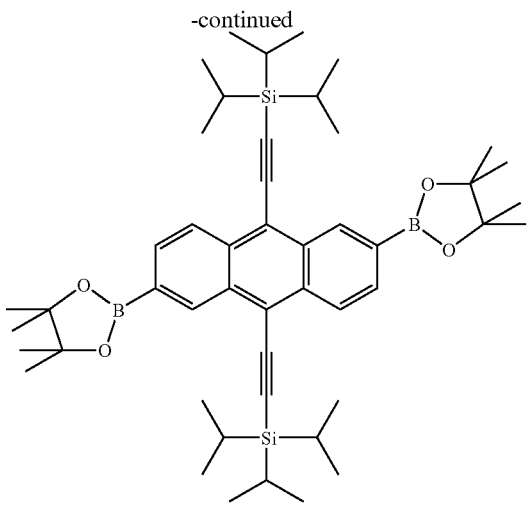

Preparatory Example 1

Synthesis of 2,6-dibromo-9,10-bis[(triisopropylsilyl)-ethynyl]anthracene

Triisopropylsilylacetylene (12.32 g, 67.5 mmol) and dry hexane (140 mL) were added under a dry nitrogen blanket to an oven-dried round bottom flask (1 L). Butyl lithium (2.7 M in hexane, 14.5 mL, 39.2 mmol) was added dropwise under dry nitrogen through a syringe to the mixture. The mixture was stirred at room temperature for 2 hours. To this colorless solution, dry THF (300 mL) and 2,6-dibromoanthraquinone (5.49 g, 15.0 mmol) were added under dry nitrogen. The solution turned red immediately and the 2,6-dibromoanthraquininone dissolved in minutes. The mixture was stirred at room temperature overnight and the solution became dark red. Deionized (DI) water (6.0 mL) was added, the color changed to light red, and a white precipitate appeared. Tin (II) chloride (8.088 g, 42.6 mmol) in HCl (18 mL, 10%) aqueous solution was then added. The mixture was heated to 60° C. for 2 hours and then cooled to room temperature. The solvent was removed by rotary evaporation. DI water (100 mL) was added to the mixture which was then extracted with hexane (100 mL×3). The hexane solution washed with DI water until neutral. It was concentrated and purified through a column chromatography (silica gel/hexane, $R_f$=0.7). A bright yellow solid (8.55 g, yield: 82%) was obtained as the product. $^1$H NMR (400 MHz, CDCl$_3$). δ ppm 8.797-8.802 (d, 2H, J=2.0 Hz), 8.431-8.454 (d, 2H, J=8.8 Hz), 7.647-7.674 (dd, 2H, J=8.8 Hz, J=2.0 Hz), 1.259 (s, 36H), 1.247 (s, 6H).

Preparatory Example 2

Synthesis of 2,6-bis-(4,4,5,5-tetramethyl-1,3,2-dioxaborolan-2-yl)-9,10-bis[(triisopropylsilyl)ethynyl]anthracene 2,6-dibromo-9,10-bis-[(triisopropylsilyl)ethynyl]anthracene (5.225 g, 7.5 mmol) from Preparatory Example 1, bis(pinacollato)diboron (4.763 g, 18.8 mmol), KOAc (2.940 g, 30.0 mmol), and CHCl$_3$ (100 mL) were charged to a 250 ml flask under dry nitrogen. A yellow solution with suspended KOAc was obtained. The suspension was degassed to remove traces of oxygen. [1,1'-bis(diphenylphosphino)ferrocene]dichloropalladium (0.205 g) was then added under dry nitrogen. The solution turned orange. The mixture was stirred at 70° C. for 3 days and then cooled to room temperature. It washed with DI water (100 mL×3) and dried over MgSO$_4$. The solvent was removed by rotary evaporation. The solid residue was purified by column chromatography (silica gel, CHCl$_3$) and recrystallized from ethyl acetate. Orange needle crystals were obtained (3.20 g, yield 55%) as the product. $^1$H NMR (400 MHz, CDCl$_3$). δ ppm 9.250-9.254 (dd, 2H, J=0.8 Hz, J=0.8 Hz), 8.579-8.603 (dd, 2H, J=8.8 Hz, J=0.8 Hz), 7.901-7.926 (dd, 2H, J=8.8 Hz, J=1.2 Hz), 1.384 (s, 24H), 1.288 (s, 36H), 1.279 (s, 6H).

The precursor 2,6-bis-(4,4,5,5-tetramethyl-1,3,2-dioxaborolan-2-yl)-9,10-bis-[(trimethylsilyl)ethynyl]anthracene was synthesized according to Reaction Scheme 2, as described in Preparatory Examples 3 and 4.

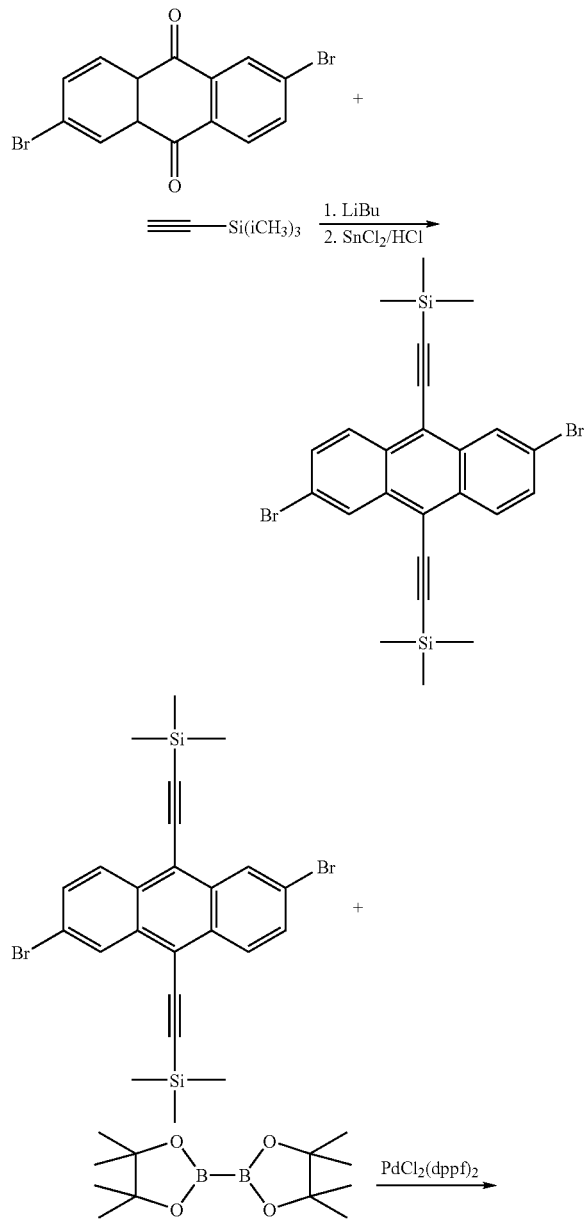

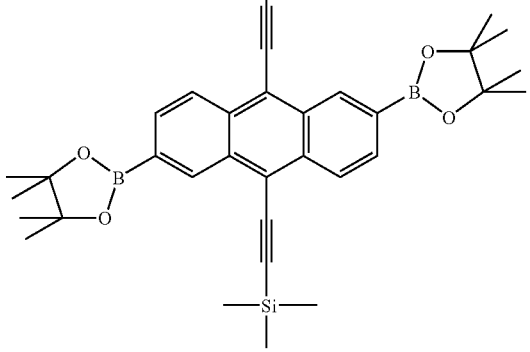

Preparatory Example 3

Synthesis of 2,6-dibromo-9,10-bis[(trimethylsilyl) ethynyl]-anthracene

Trimethylsilylacetylene (13.51 g, 137.5 mmol) and dry hexane (300 mL) were charged to an oven-dried round bottom flask (1 L) under dry nitrogen. Butyl lithium (2.7 M in hexane, 46.3 mL, 125.1 mmol) was added dropwise under dry nitrogen through a syringe with water bath cooling. A white precipitate appeared immediately. The mixture was stirred at room temperature for 2 hours. It was then added to a suspension of 2,6-dibromoanthraquinone (18.30 g, 50.0 mmol) in dry THF (600 mL) under dry nitrogen. All of the solids dissolved after the addition and a dark red solution was obtained. A precipitate appeared after about 1 hour. The reaction mixture was stirred at room temperature for 16 hours. DI water (10.0 mL) was added and a white precipitate appeared. Tin (II) chloride (22.8 g, 120 mmol) in HCl (50 mL, 6 M) aqueous solution was then added. The mixture was heated to 70° C. for 2 hours and then cooled to room temperature. The solvent was removed by rotary evaporation. The residue washed with water and then extracted with warm CHCl$_3$ (300 mL). After removal of the CHCl$_3$ solvent, the residue was recrystallized from CHCl$_3$. An orange solid (22.1 g, yield 84%) was obtained as the product. $^1$H NMR (400 MHz, CDCl$_3$). δ ppm 9.061-9.100 (d, 2H, J=2.4 Hz), 8.757-8.812 (d, 2H, J=9.2 Hz), 8.030-8.091 (dd, 2H, J=9.2 Hz, J=2.0 Hz), 0.851 (s, 18H).

Preparatory Example 4

Synthesis of 2,6-bis-(4,4,5,5-tetramethyl-1,3,2-dioxaborolan-2-yl)-9,10-bis-[(trimethylsilyl)ethynyl] anthracene 2,6-dibromo-9,10-bis[(trimethylsilyl)ethynyl]anthracene (5.284 g, 10.0 mmol) from Preparatory Example 3, bis(pinacollato)diboron (5.587 g, 22.0 mmol), KOAc (2.454 g, 25.0 mmol), and [1,1'-bis(diphenylphosphino)ferrocene]dichloropalladium (0.273 g) were charged to a 250 mL flask under dry nitrogen. After degassing under dry nitrogen using a Schlenk line, dry THF (120 mL) was added through a syringe. A dark red solution with suspended KOAc was obtained. The mixture was stirred at 70° C. for 4 days and then cooled to room temperature. It was condensed by rotary evaporation and then poured into DI water (500 mL). The precipitate was collected by filtration. After air drying, it was purified by zone sublimation under $1.5 \times 10^{-5}$ Torr while keeping the source zone at 250° C. and central zone at 190° C. An orange solid was obtained (1.72 g, yield 28%) as product. $^1$H NMR (400 MHz, CDCl$_3$). δ ppm 9.145-9.140 (dd, 2H, J=0.8 Hz, J=0.4 Hz), 8.505-8.528 (dd, 2H, J=8.4 Hz, J=0.8 Hz), 7.878-7.902 (dd, 2H, J=8.4 Hz, J=1.2 Hz), 1.406 (s, 24H), 0.447 (s, 18H).

The Suzuki coupling reaction was used to synthesize the acene-thiophene copolymers of Examples 1-5, as shown in Reaction Scheme 3.

Reaction Scheme 3

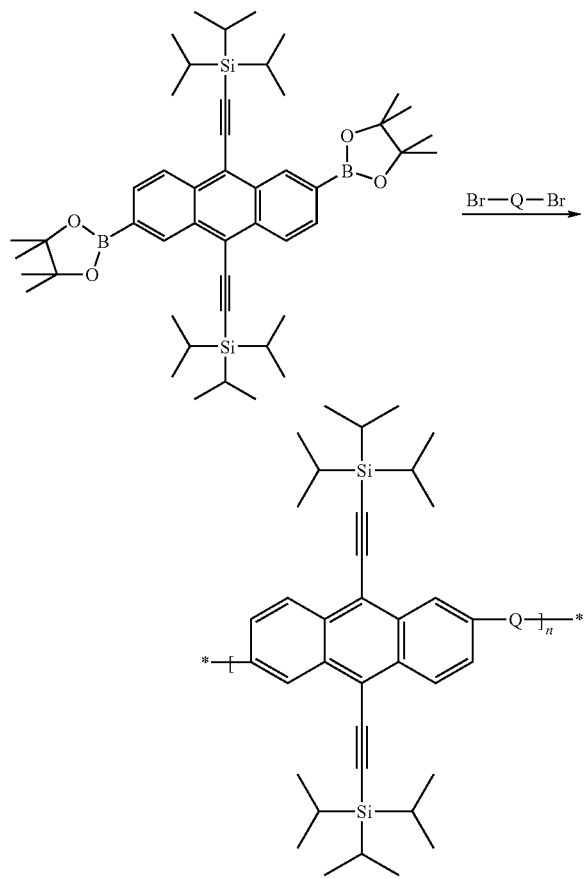

The Br-Q-Br compounds were 2,5-dibromo-3,4-dihexylthiophene (Example 1), 2,5-dibromo-3,4-ethylenedioxythiophene (Example 2), 2,5-dibromothiophene (Example 3), 2,5-dibromo-3-hexylthiophene (Example 4), and 2,5-dibromo-3,6-dinonyl-thieno[3,2-b]thiophene (Example 5).

Example 1

Synthesis of poly(3,4-dihexyl-2,5-thiophene-alt-9,10-bis-[(triisopropylsilyl)ethynyl]-2,6-anthracene)

A 250 mL Schlenk flask was charged with 2,6-bis-(4,4,5,5-tetramethyl-1,3,2-dioxaborolan-2-yl)-9,10-bis[(triisopropylsilyl)ethynyl]anthracene (3.909 g, 5.04 mmol), 2,5-dibromo-3,4-dihexylthiophene (2.121 g, 5.17 mmol), sodium carbonate (2.65 g, 25.0 mmol), ALIQUAT 336 (1.0 g), distilled water (10 mL), and toluene (100 mL). The mixture was degassed three times under nitrogen using a Schlenk line to remove oxygen. Tetrakis(triphenylphosphine)palladium(0) (0.125 g, 0.10 mmol) was then added under a dry nitrogen flow. After degassing one more time, the mixture was stirred under dry nitrogen at 90° C. for 72 hours. It was then cooled to room temperature. The red toluene solution was separated and washed with DI water (150 mL×3). It was then filtered to remove traces of solid impurity. The filtrate was added to MeOH (350 mL) with vigorous stirring. The red precipitate was collected by filtration and was then washed with MeOH (via Soxhlet extraction) for 24 hours. A red solid (3.53 g, yield: 89%) was obtained as the product. Mw=36,300 g/mol. $^1$H NMR (400 MHz, CDCl$_3$). δ ppm 8.81-8.90 (br, 2H), 8.61-8.76 (br, 2H), 7.71-7.87 (br, 2H), 2.68-3.05 (br, 4H), 1.46-1.63 (br, 4H), 1.09-1.40 (br, 54H), 0.69-0.84 (br, 6H).

Example 2

Synthesis of poly(3,4-ethylenedioxy-2,5-thiophene-alt-9,10-bis-[(triisopropylsilyl)ethynyl]-2,6-anthracene)

A 250 mL Schlenk flask was charged with 2,6-bis-(4,4,5,5-tetramethyl-1,3,2-dioxaborolan-2-yl)-9,10-bis-[(triisopropylsilyl)ethynyl]anthracene (1.552 g, 2.00 mmol), 2,5-dibromo-3,4-ethylenedioxythiophene (0.600 g, 2.00 mmol), sodium carbonate (1.060 g, 10.0 mmol), ALIQUAT 336 (0.241 g), distilled water (10 mL), and toluene (100 mL). The mixture was degassed three times under nitrogen using a Schlenk line to remove oxygen. Tetrakis(triphenylphosphine) palladium(0) (0.025 g, 0.02 mmol) was then added under dry nitrogen flow. After degassing one more time, the mixture was stirred under dry nitrogen at 90° C. for 46 hours. To end cap the copolymer, additional 2,6-bis-(4,4,5,5-tetramethyl-1,3,2-dioxaborolan-2-yl)-9,10-bis[(triisopropylsilyl)ethynyl]anthracene (0.015 g) was added, followed 24 hours later by bromobenzene (0.5 mL). The solution was stirred another 24 hours and cooled to room temperature. The toluene solution was separated and washed with DI water (150 mL×3). It was then filtered to remove traces of solid impurity. The filtrate was added to MeOH (350 mL) with vigorously stirring. The red precipitate was collected by filtration and was then washed with MeOH (via Soxhlet extraction) for 24 hours. A red solid (1.39 g, yield: approximately 100%) was obtained as the product. Mw=11,000 g/mol. $^1$H NMR (400 MHz, CDCl$_3$). δ ppm 8.91-9.30 (br, 2H), 8.49-8.91 (br, 2H), 7.75-8.31 (br, 2H), 4.19-4.71 (br, 4H), 1.12-1.15 (br, 42H).

Example 3

Synthesis of poly(2,5-thiophene-alt-9,10-bis[(triisopropylsilyl)ethynyl]-2,6-anthracene)

A Schlenk flask (250 mL) was charged with 2,6-bis-(4,4,5,5-tetramethyl-1,3,2-dioxaborolan-2-yl)-9,10-bis[(triisopropylsilyl)ethynyl]anthracene (0.3888 g, 0.50 mmol), 2,5-dibromothiophene (0.121 g, 0.50 mmol), sodium carbonate (0.265 g, 2.50 mmol), ALIQUAT 336 (0.118 g), distilled water (3 mL), and toluene (30 mL). The mixture was degassed three times under nitrogen using a Schlenk line to remove oxygen. Tetrakis(triphenylphosphine)palladium(0) (0.016 g, 0.01 mmol) was then added under dry nitrogen flow. After degassing one more time, the mixture was stirred under dry nitrogen at 90° C. for 48 hours. It was cooled to room temperature. The red toluene solution was separated and washed with DI water (150 mL×3). It was then filtered to remove traces of solid impurity. The filtrate was added to MeOH (200 mL) with vigorously stirring. The red precipitate was collected by filtration and was then washed with MeOH (via Soxhlet extraction) for 24 hours. A red solid (0.28 g, yield: 91%) was obtained as the product. Mw=8,500 g/mol. $^1$H NMR (400 MHz, CDCl$_3$). δ ppm 8.10-9.00 (br, 4H), 7.50-8.00 (br, 2H), 7.00-7.50 (br, 2H), 0.93-1.96 (br, 42H).

Example 4

Synthesis of poly(3-hexyl-2,5-thiophene-alt-9,10-bis [(triisopropylsilyl)-ethynyl]-2,6-anthracene)

A 250 mL Schlenk flask was charged with 2,6-bis-(4,4,5, 5-tetramethyl-1,3,2-dioxaborolan-2-yl)-9,10-bis[(triisopropylsilyl)ethynyl]anthracene (1.552 g, 2.00 mmol), 2,5-dibromo-3-hexylthiophene (0.652 g, 2.00 mmol), sodium carbonate (1.060 g, 10.0 mmol), ALIQUAT 336 (0.241 g), distilled water (10 mL), and toluene (100 mL). The mixture was degassed three times under dry nitrogen using a Schlenk line to remove oxygen. Tetrakis(triphenylphosphine)palladium(0) (0.030 g, 0.02 mmol) was then added under dry nitrogen flow. After degassing one more time, the mixture was stirred under dry nitrogen at 90° C. for 48 hours. Additional 2,6-bis-(4,4,5,5-tetramethyl-1,3,2-dioxaborolan-2-yl)-9,10-bis[(triisopropylsilyl)ethynyl]anthracene (0.015 g) was added and the reaction was stirred for 15 hours, and followed with the addition of bromobenzene (80 μL (microliter)). The reaction mixture was stirred another 24 h and cooled to room temperature. The red toluene solution was separated and washed with DI water (100 mL×4). It was then filtered to remove traces of solid impurity. The filtrate was concentrated and added to MeOH (300 mL) with vigorously stirring. The red precipitate was collected by filtration and was then washed with MeOH (via Soxhlet extraction) for 24 hours. A red solid (1.24 g, yield: 88%) was obtained as the product. Mw=11,600 g/mol. $^1$H NMR (400 MHz, CDCl$_3$). δ ppm 8.89-9.06 (br, 1H), 8.78-8.87 (br, 1H), 8.62-8.74 (br, 2H), 7.88-8.01 (br, 1H), 7.74-7.86 (br, 1H), 7.52-7.65 (br, 1H), 2.82-3.03 (br, 2H), 1.69-1.84 (br, 2H), 1.08-1.50 (br, 48H), 0.71-0.90 (br, 3H).

Example 5

Synthesis of poly(3,6-dinonyl-2,5-thieno[3,2-b] thiophene-alt-9,10-bis-[(triisopropylsilyl)ethynyl]-2, 6-anthracene)

A 100 mL Schlenk flask was charged with 2,6-bis-(4,4,5, 5-tetramethyl-1,3,2-dioxaborolan-2-yl)-9,10-bis[(triisopropylsilyl)ethynyl]anthracene (0.233 g, 0.30 mmol), 2,5-dibromo-3,6-dinonyl-thieno[3,2-b]thiophene (0.165 g, 0.30 mmol), sodium carbonate (0.159 g, 1.5 mmol), ALIQUAT 336 (0.096 g), distilled water (1.5 mL), and toluene (30 mL). The mixture was degassed three times under dry nitrogen using a Schlenk line to remove oxygen. Tetrakis(triphenylphosphine)palladium(0) (0.009 g) was then added under dry nitrogen flow. After degassing one more time, the mixture was stirred under dry nitrogen at 90° C. for 45 hours. It was cooled to room temperature. The red toluene solution was separated and washed with DI water (100 mL×3). It was then filtered to remove traces of solid impurity. The filtrate was concentrated and added to MeOH (200 mL) with vigorously stirring. The red precipitate was collected by filtration and was then washed with MeOH (via Soxhlet extraction) for 24 h. A red solid (0.105 g, yield: 38%) was obtained as the product. Mw=13,100 g/mol. $^1$H NMR (400 MHz, CDCl$_3$). δ ppm 8.78-8.95 (br, 2H), 8.54-8.77 (br, 2H), 7.70-7.97 (br, 2H), 2.58-3.17 (br, 4H), 1.68-2.00 (br, 4H), 1.03-1.50 (br, 66H), 0.68-0.90 (br, 6H).

The Suzuki coupling reaction was used to synthesize the acene-thiophene copolymers of Examples 6 and 7, as shown in Reaction Scheme 4.

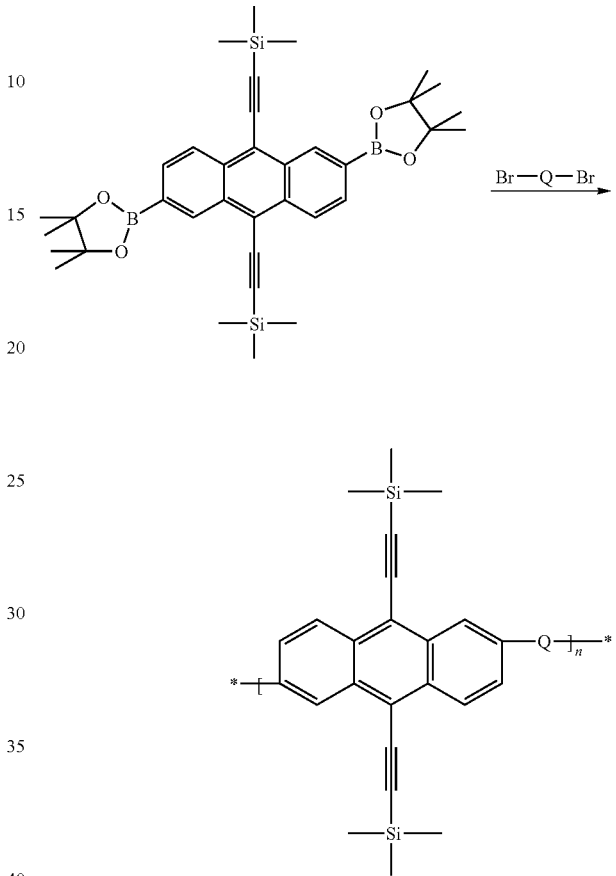

Reaction Scheme 4

The Br-Q-Br compounds were 2,5-dibromo-3,4-ethylenedioxythiophene (Example 6) and 2,5-dibromo-3-hexylthiophene (Example 7).

Example 6

Synthesis of poly(3,4-ethylene-2,5-dioxythiophene-alt-9,10-bis-[(trimethylsilyl)ethynyl]-2,6-anthracene)

A 100 mL Schlenk flask was charged with 2,6-bis-(4,4,5, 5-tetramethyl-1,3,2-dioxaborolan-2-yl)-9,10-bis[(trimethylsilyl)ethynyl]anthracene (0.150 g, 0.241 mmol), 2,5-dibromo-3,4-ethylenedioxythiophene (0.072 g, 0.241 mmol), sodium carbonate (0.128 g, 1.20 mmol), ALIQUAT 336 (0.050 g), distilled water (1.0 mL), and toluene (250 mL). The mixture was degassed three times under nitrogen using a Schlenk line to remove oxygen. Tetrakis(triphenylphosphine) palladium(0) (0.005 g, 0.004 mmol) was then added under a dry nitrogen flow. After degassing one more time, the mixture was stirred under dry nitrogen at 90° C. for 72 hours. A dark red precipitate appeared and was collected by filtration as product (0.12 g, yield: approximately 100%).

Example 7

Synthesis of poly(3-hexyl-2,5-thiophene-alt-9,10-bis[(trimethylsilyl)-ethynyl]-2,6-anthracene)

A 100 mL Schlenk flask was charged with 2,6-bis(4,4,5,5-tetramethyl-1,3,2-dioxaborolan-2-yl)-9,10-bis[(trimethylsilyl)ethynyl]anthracene (0.150 g, 0.241 mmol), 2,5-dibromo-3-hexylthiophene (0.079 g, 0.241 mmol), sodium carbonate (0.127 g, 1.20 mmol), ALIQUAT 336 (0.046 g), distilled water (1.0 mL), and toluene (25 mL). The mixture was degassed three times under nitrogen in a Schlenk line to remove oxygen. Tetrakis(triphenylphosphine)palladium(0) (0.005 g, 0.004 mmol) was then added under a dry nitrogen flow. After degassing one more time, the mixture was stirred under dry nitrogen at 90° C. for 72 hours. A dark red precipitate appeared and was collected by filtration as product (0.13 g, yield: approximately 100%).

We claim:

1. A copolymer of Formula I

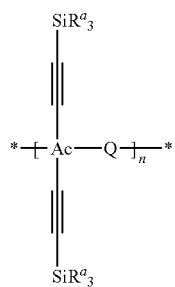

I wherein

Ac is a radical of an acene having 2 to 5 fused benzene rings, wherein Ac can be optionally substituted with a substituent selected from an alkyl, alkoxy, thioalkyl, aryl, aralkyl, halo, haloalkyl, hydroxyalkyl, heteroalkyl, alkenyl, or combinations thereof;

$R^a$ is each independently selected from hydrogen, alkyl, alkoxy, alkenyl, aryl, heteroaryl, aralkyl, heteroaralkyl, heteroalkyl, or hydroxyalkyl;

Q is a divalent group of Formula II, III, IV, or V;

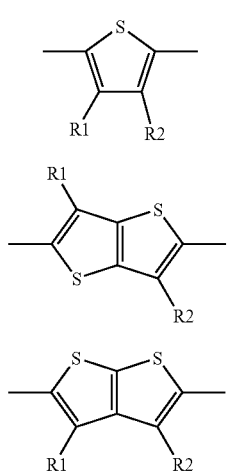

II

III

IV

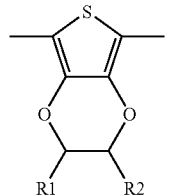

V

R1 and R2 are each independently selected from hydrogen, alkyl, alkoxy, thioalkyl, aryl, aralkyl, halo, haloalkyl, hydroxyalkyl, heteroalkyl, or alkenyl; and n is an integer greater than or equal to 4.

2. The copolymer of claim 1, wherein Ac is a radical of an acene selected from naphthalene, anthracene, or pentacene.

3. The copolymer of claim 1, wherein a divalent group of formula —Ac(E)$_2$— where each E equal to a silylethynyl group of formula —C≡C—Si($R^a$)$_3$ is selected from 1,4-bis(silylethynyl)naphthalene-2,6-diyl, 1,4-bis(silylethynyl)naphthalene-2,7-diyl, 9,10-bis(silylethynyl)anthracene-2,6-diyl, 9,10-bis(silylethynyl)anthracene-2,7-diyl, 2,6-bis(silylethynyl)anthracene-9,10-diyl, 2,7-bis(silylethynyl)anthracene-9,10-diyl, 6,13-bis(silylethynyl)pentacene-2,9-diyl, 6,13-bis(silylethynyl)pentacene-2,10-diyl, 2,9-bis(silylethynyl)pentacene-6,13-diyl, or 2,10-bis(silylethynyl)pentacene-6,13-diyl.

4. The copolymer of claim 3, wherein the divalent group of formula —Ac(E)$_2$— is selected from 1,4-bis(silylethynyl)naphthalene-2,6-diyl, 9,10-bis(silylethynyl)anthracene-2,6-diyl, or 6,13-bis(silylethynyl)pentacene-2,9-diyl.

5. The copolymer of claim 1, wherein a divalent group of formula —Ac(E)$_2$— where each E equal to a silylethynyl group of formula —C≡C—Si($R^a$)$_3$ is selected from 1,4-bis(trialkylsilylethynyl)naphthalene-2,6-diyl, 1,4-bis(trialkylsilylethynyl)naphthalene-2,7-diyl, 9,10-bis(trialkylsilylethynyl)anthracene-2,6-diyl, 9,10-bis(trialkylsilylethynyl)anthracene-2,7-diyl, 2,6-bis(trialkylsilylethynyl)anthracene-9,10-diyl, 2,7-bis(trialkylsilylethynyl)anthracene-9,10-diyl, 6,13-bis(trialkylsilylethynyl)pentacene-2,9-diyl, 6,13-bis(trialkylsilylethynyl)pentacene-2,10-diyl, 2,9-bis(trialkylsilylethynyl)pentacene-6,13-diyl, or 2,10-bis(trialkylsilylethynyl)pentacene-6,13-diyl.

6. The copolymer of claim 2, wherein $R^a$ is an alkyl having up to 10 carbon atoms.

7. The copolymer of claim 2, wherein Q is Formula II

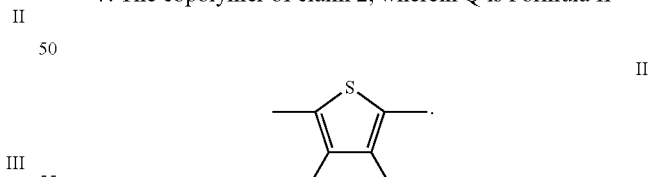

II

8. The copolymer of claim 7, wherein at least one of R1 and R2 is an alkyl having at least 4 carbon atoms, an alkoxy having at least 4 carbon atoms, a thioalkyl having at least 4 carbon atoms, an aryl having at least 6 carbon atoms, an aralkyl having at least 10 carbon atoms, a haloalkyl having at least 4 carbon atoms, a hydroxyalkyl having at least 4 carbon atoms, a heteroalkyl having at least 4 carbon atoms, an alkenyl having at least 4 carbon atoms, or a combination thereof.

9. The copolymer of claim 7, wherein a divalent group of formula —Ac(E)$_2$— where each E equal to a silylethynyl group of formula —C≡C—Si(R$^a$)$_3$ is selected from 1,4-bis (silylethynyl)naphthalene-2,6-diyl, 9,10-bis(silylethynyl)anthracene-2,6-diyl, or 6,13-bis(silylethynyl)pentacene-2,9-diyl.

10. The copolymer of claim 2, wherein Q is of Formula III or IV

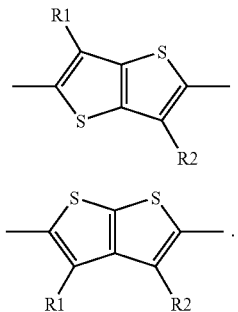

11. The copolymer of claim 10, wherein at least one of R1 and R2 is an alkyl having at least 4 carbon atoms, an alkoxy having at least 4 carbon atoms, a thioalkyl having at least 4 carbon atoms, an aryl having at least 6 carbon atoms, an aralkyl having at least 10 carbon atoms, a haloalkyl having at least 4 carbon atoms, a hydroxyalkyl having at least 4 carbon atoms, a heteroalkyl having at least 4 carbon atoms, an alkenyl having at least 4 carbon atoms, or a combination thereof.

12. The copolymer of claim 10, wherein a divalent group of formula —Ac(E)$_2$— where each E equal to a silylethynyl group of formula —C≡C—Si(R$^a$)$_3$ is selected from 1,4-bis (silylethynyl)naphthalene-2,6-diyl, 9,10-bis(silylethynyl)anthracene-2,6-diyl, or 6,13-bis(silylethynyl)pentacene-2,9-diyl.

13. The copolymer of claim 2, wherein Q is of Formula V

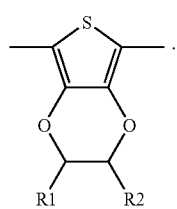

14. The copolymer of claim 13, wherein at least one of R1 and R2 is an alkyl having at least 4 carbon atoms, an alkoxy having at least 4 carbon atoms, a thioalkyl having at least 4 carbon atoms, an aryl having at least 6 carbon atoms, an aralkyl having at least 10 carbon atoms, a haloalkyl having at least 4 carbon atoms, a hydroxyalkyl having at least 4 carbon atoms, a heteroalkyl having at least 4 carbon atoms, an alkenyl having at least 4 carbon atoms, or a combination thereof.

15. The copolymer of claim 13, wherein a divalent group of formula —Ac(E)$_2$— where each E equal to a silylethynyl group of formula —C≡C—Si(R$^a$)$_3$ is selected from 1,4-bis (silylethynyl)naphthalene-2,6-diyl, 9,10-bis(silylethynyl)anthracene-2,6-diyl, or 6,13-bis(silylethynyl)pentacene-2,9-diyl.

16. A composition comprising a solvent and a copolymer of Formula I

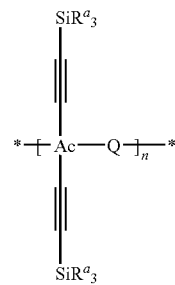

wherein
Ac is a radical of an acene having 2 to 5 fused benzene rings, wherein Ac can be optionally substituted with a substituent selected from an alkyl, alkoxy, thioalkyl, aryl, aralkyl, halo, haloalkyl, hydroxyalkyl, heteroalkyl, alkenyl, or combinations thereof;

R$^a$ is each independently selected from hydrogen, alkyl, alkoxy, alkenyl, aryl, heteroaryl, aralkyl, heteroaralkyl, heteroalkyl, or hydroxyalkyl;

Q is a divalent group of Formula II, III, IV, or V;

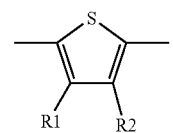

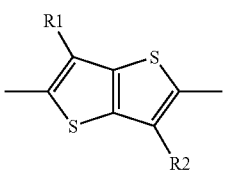

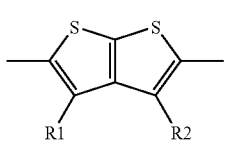

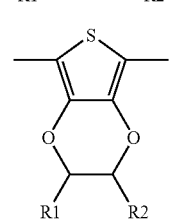

R1 and R2 are each independently selected from hydrogen, alkyl, alkoxy, thioalkyl, aryl, aralkyl, halo, haloalkyl, hydroxyalkyl, heteroalkyl, or alkenyl; and n is an integer greater than or equal to 4.

17. The composition of claim 16, wherein Ac is a radical of an acene selected from naphthalene, anthracene, or pentacene.

18. The composition of claim 16, wherein a divalent group of formula —Ac(E)$_2$— where each E equal to a silylethynyl group of formula —C≡C—Si(R$^a$)$_3$ is selected from 1,4-bis (silylethynyl)naphthalene-2,6-diyl, 1,4-bis(silylethynyl) naphthalene-2,7-diyl, 9,10-bis(silylethynyl)anthracene-2,6- diyl, 9,10-bis(silylethynyl)anthracene-2,7-diyl, 2,6-bis(silylethynyl)anthracene-9,10-diyl, 2,7-bis(silylethynyl)anthracene-9,10-diyl, 6,13-bis(silylethynyl)pentacene-2,9-diyl, 6,13-bis(silylethynyl)pentacene-2,10-diyl, 2,9-bis(silylethynyl)pentacene-6,13-diyl, or 2,10-bis(silylethynyl)pentacene-6,13-diyl.

19. The composition of claim 18, wherein the divalent group of formula —Ac(E)$_2$— is selected from 1,4-bis(silylethynyl)naphthalene-2,6-diyl, 9,10-bis(silylethynyl)anthracene-2,6-diyl, or 6,13-bis(silylethynyl)pentacene-2,9-diyl.

20. The composition of claim 17, wherein $R^a$ is alkyl having up to 10 carbon atoms.

* * * * *

UNITED STATES PATENT AND TRADEMARK OFFICE
CERTIFICATE OF CORRECTION

| | | |
|---|---|---|
| PATENT NO. | : 7,666,968 B2 | Page 1 of 1 |
| APPLICATION NO. | : 11/379642 | |
| DATED | : February 23, 2010 | |
| INVENTOR(S) | : Zhu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 933 days.

Signed and Sealed this

Seventh Day of December, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,666,968 B2 |
| APPLICATION NO. | : 11/379642 |
| DATED | : February 23, 2010 |
| INVENTOR(S) | : Peiwang Zhu et al. |

It is certified that error appears in the above-identified patent and that said Letters Patent is hereby corrected as shown below:

On the Title Pg, Item (54) & Column 1, line 2
(Title); Delete "SILETHYNLY" and insert -- SILYLETHYNYL --, therefor.

On the Title Pg, Item (56), Page 2
(Other Publications); Line 46, Delete "Polymetallorotaxanes:" and insert
-- Polymetallicrotaxanes: --, therefor.
(Other Publications); Line 64, Delete "Silethynly" and insert -- Silylethynyl --, therefor.

Column 1
Line 2; Delete "SILETHYNLY" and insert -- SILYLETHYNYL --, therefor.

Column 10
Line 60; Delete " $\xrightarrow{SnCl2/HCL}$ " and insert -- $\xrightarrow{SnCl_2/HCL}$ --, therefor.

Column 13
Line 27; After "compounds" delete "compounds". (second occurrence)

Column 14
Line 50; Delete "Ia" and insert -- IIa --, therefor.

Column 16
Line 46; Delete "bis(pinacollato)diboron," and insert -- bis(pinacolato)diboron, --, therefor.

Column 18
Line 36-37, Delete "2,6-dibromoanthraquininone" and insert -- 2,6-dibromoanthraquinone --, therefor.
Line 46, After "solution" insert -- was --.

Signed and Sealed this
Thirtieth Day of August, 2011

David J. Kappos
*Director of the United States Patent and Trademark Office*

CERTIFICATE OF CORRECTION (continued)
U.S. Pat. No. 7,666,968 B2

Column 19
Line 2, After "It" insert -- was --.

Column 20
Line 43, After "residue" insert -- was --.